United States Patent
Kim et al.

(10) Patent No.: US 8,488,341 B2
(45) Date of Patent: Jul. 16, 2013

(54) SWITCHING MODE POWER SUPPLY FOR REDUCING POWER CONSUMPTION IN A WAITING MODE

(75) Inventors: Hyun June Kim, Daejeon (KR); Dae Young Youn, Daejeon (KR); Hyun Soo Park, Daejeon (KR); Sang Min Kim, Daejeon (KR); Hyo Nam Kim, Daejeon (KR)

(73) Assignee: Smart Power Solutions, Inc., Daejon (KR)

( * ) Notice: Subject to any disclaimer, the term of this patent is extended or adjusted under 35 U.S.C. 154(b) by 376 days.

(21) Appl. No.: 12/743,239

(22) PCT Filed: Mar. 26, 2010

(86) PCT No.: PCT/KR2010/001863
§ 371 (c)(1),
(2), (4) Date: May 17, 2010

(87) PCT Pub. No.: WO2011/081255
PCT Pub. Date: Jul. 7, 2011

(65) Prior Publication Data
US 2011/0273912 A1 Nov. 10, 2011

(30) Foreign Application Priority Data

Dec. 30, 2009 (KR) .......................... 10-2009-0134316
Jan. 22, 2010 (KR) ............................ 10-2010-005921

(51) Int. Cl.
*H02M 3/335* (2006.01)
(52) U.S. Cl.
USPC ................. 363/21.15; 363/21.16; 363/21.17; 363/21.18
(58) Field of Classification Search
USPC ................. 363/21.07–21.1, 21.15–21.18, 65, 363/73
See application file for complete search history.

(56) References Cited

U.S. PATENT DOCUMENTS 5,341,179 A * 8/1994 Konishi ........................ 348/730
5,920,466 A * 7/1999 Hirahara ..................... 363/21.02
(Continued)

FOREIGN PATENT DOCUMENTS

JP 2003143843 A 5/2003

OTHER PUBLICATIONS

International Search Report for PCT Application No. PCT/KR2010/001863 mailed Jan. 28, 2011.

*Primary Examiner* — Adolf Berhane
*Assistant Examiner* — Gary Nash
(74) *Attorney, Agent, or Firm* — Oppedahl Patent Law Firm LLC (57) ABSTRACT

A switching mode power supply (SNIPS) includes a rectifying unit transforming AC power input from outside to DC power, a main transformer transforming and outputting the rectified DC power, a pulse width modulation control unit controlling output voltage by applying a pulse signal to a primary winding of the main transformer, and a feedback control unit controlling an output signal of the pulse width modulation control unit by detecting output voltage of the main transformer, including: a first state transform unit, including: a second photo diode; and a second photo transistor included between an AC power input unit and the pulse width modulation control unit to form a photo coupler with the second photo diode, and a second state transform unit, including: a comparator connected to a secondary winding of the main transformer to apply the output voltage and reference voltage to an inverting terminal and a noninverting terminal, and compare the output voltage with the reference voltage and output the voltage through an output terminal.

6 Claims, 7 Drawing Sheets

U.S. PATENT DOCUMENTS

| | | | |
|---|---|---|---|
| 6,496,390 B2 * | 12/2002 | Yang | 363/21.07 |
| 6,671,193 B1 * | 12/2003 | Pelkonen | 363/53 |
| 6,912,141 B2 | 6/2005 | Konno | |
| 7,218,532 B2 * | 5/2007 | Choi et al. | 363/21.01 |
| 2005/0073867 A1 * | 4/2005 | Byun | 363/84 |
| 2008/0106916 A1 | 5/2008 | Yamazaki | |
| 2008/0122296 A1 * | 5/2008 | Cruz | 307/125 |
| 2008/0266907 A1 * | 10/2008 | Kim et al. | 363/21.1 |
| 2009/0052212 A1 * | 2/2009 | Lee | 363/65 |
| 2009/0129133 A1 * | 5/2009 | Khan | 363/126 |
| 2009/0287947 A1 | 11/2009 | Dubose | |
| 2009/0295469 A1 | 12/2009 | Dubose | |
| 2009/0300400 A1 | 12/2009 | Dubose | |
| 2009/0322314 A1 * | 12/2009 | Long et al. | 324/142 |
| 2011/0157922 A1 * | 6/2011 | Konecny et al. | 363/21.12 |

* cited by examiner

SWITCHING MODE POWER SUPPLY FOR REDUCING POWER CONSUMPTION IN A WAITING MODE

The present invention relates to a switching mode power supply, and more particularly, to a switching mode power supply for reducing power consumption in a waiting mode.

BACKGROUND

A switching mode power supply means a device for transforming one direct current supply voltage into more than one direct current output voltage. The direct current output voltage has a value larger or smaller than that of the direct current supply voltage.

The switching mode power supply is mainly used in battery power electronic devices such as power electronic devices, particularly a mobile phone and a laptop computer. The power electronic devices have a normal operation mode that consumes a relatively large power and a waiting mode that consumes a relatively small power.

Meanwhile, the power electronic device automatically goes into a waiting mode when a user does not use the power electronic device for a predetermined period of time. When the user uses the power electronic device again, the power electronic device returns to a normal operation mode.

In most power electronic devices, an amount of power consumption in the waiting mode is very small in comparison with an amount of power consumption in the normal operation mode. Recently, regulation on input power in the waiting mode has been gradually reinforced to reduce the amount of power consumption more in the waiting mode.

Generally, a method for reducing output voltage of the switching mode power supply in order to correspond to the regulation or reducing the amount of power consumption in the waiting mode by using individual auxiliary power devices is used.

However, the general method is not preferred since additional constituent elements are required to increase a product price. Also, the general method may show output voltage that is too low to operate the power electronic devices. Accordingly, there is a problem that the amount of power consumption to be reduced is limited.

Meanwhile, when the general switching mode power supply is in a waiting mode, it is inevitable that switching loss incurs in the switching mode power supply in spite of reduction of the amount of power consumption by the reduced output voltage.

In addition, the general switching mode power supply changes a duty cycle of a power switch to compensate changes of power requirement in an output stage and be operated at a regular frequency unrelated to the amount of the supplied power.

Consequently, the power switch of the switching mode power supply performs an on/off switching operation in the waiting mode at the same frequency as that of the normal operation mode. There is a limitation that thus switching operation incurs power loss in the waiting mode by generating a considerable amount of consumption power.

Accordingly, it is essentially required to develop a switching mode power supply that can reduce power consumption more in a waiting mode.

SUMMARY

An object of the present invention suggested for improving general technology is to provide a switching mode power supply (SNIPS) that can reduce power consumption in a waiting mode by controlling supply of alternating current (AC) power to a pulse width modulation control unit or controlling a size of input voltage supplied to a feedback control unit, the switching mode power supply, including a rectifying unit for transforming AC power inputted from outside into direct current (DC) power, a transformer for transforming and outputting the DC power rectified in the rectifying unit, a pulse width modulation control unit for controlling output voltage by applying a pulse signal to a primary winding of the transformer, and a feedback control unit for controlling an output signal of a pulse width modulation control unit by detecting output voltage of the transformer.

In one general aspect, a switching mode power supply (SMPS) including a rectifying unit transforming alternating current (AC) power input from outside into direct current (DC) power, a main transformer transforming and outputting the rectified DC power, a pulse width modulation control unit controlling output voltage by applying a pulse signal to a primary winding of the main transformer, and a feedback control unit controlling an output signal of the pulse width modulation control unit by detecting output voltage of the main transformer, includes: a first switching device having one end connected to an AC power input unit receiving the AC power and the other end, which is connected to the pulse width modulation control unit and performs switching on supply of the AC power to the pulse width modulation control unit.

In another general aspect, a switching mode power supply (SMPS) including a rectifying unit transforming alternating current (AC) power input from outside into direct current (DC) power, a main transformer transforming and outputting the rectified DC power, a pulse width modulation control unit controlling output voltage by applying a pulse signal to a primary winding of the main transformer, and a feedback control unit controlling an output signal of the pulse width modulation control unit by detecting output voltage of the main transformer, further includes: a first state transform unit, including: a second photo diode; and a second photo transistor that forms a photo coupler with the second photo diode and is included between the AC power input unit and the pulse width modulation control unit.

In another general aspect, a switching mode power supply including a rectifying unit transforming AC power input from outside to DC power, a main transformer transforming and outputting the rectified DC power, a pulse width modulation control unit controlling output voltage by applying a pulse signal to a primary winding of the main transformer, and a feedback control unit controlling an output signal of the pulse width modulation control unit by detecting output voltage of the main transformer, further includes: a second state transform unit including a comparator connected to a secondary winding of the main transformer to apply the output voltage and reference voltage to an inverting terminal and a noninverting terminal, and compare the output voltage with the reference voltage and output the voltage through an output terminal.

In still another general aspect, a switching mode power supply including a rectifying unit transforming AC power input from outside to DC power, a main transformer transforming and outputting the rectified DC power, a pulse width modulation control unit controlling output voltage by applying a pulse signal to a primary winding of the main transformer, and a feedback control unit controlling an output signal of the pulse width modulation control unit by detecting output voltage of the main transformer, includes: a first state transform unit, including: a second photo diode; and a second photo transistor included between an AC power input unit and the pulse width modulation control unit to form a photo coupler with the second photo diode, and a second state transform unit, including: a comparator connected to a secondary winding of the main transformer to apply the output voltage and reference voltage to an inverting terminal and a noninverting terminal, and compare the output voltage with the reference voltage and output the voltage through an output terminal.

The method for controlling the switching mode power supply may include: receiving AC power; driving a first state transform unit by receiving power from a transformer, a battery, and a large-capacity capacitor; and driving a second state transform unit when a consumption charge quantity of an electronic device using output voltage of a main transformer transforming and outputting the AC power is lower than a predetermined reference value.

A switching mode power supply of the present invention reduces power consumption in a waiting mode by controlling supply of alternating current (AC) power to a pulse width modulation control unit or controlling a size of input voltage supplied to a feedback control unit, the switching mode power supply, including a rectifying unit for transforming AC power inputted from outside into direct current (DC) power, a transformer for transforming and outputting the DC power rectified in the rectifying unit, a pulse width modulation control unit for controlling output voltage by applying a pulse signal to a primary winding of the transformer, and a feedback control unit for controlling an output signal of a pulse width modulation control unit by detecting output voltage of the transformer.

DETAILED DESCRIPTION

Hereinafter, the embodiments of the present invention will be described in detail with reference to accompanying drawings.

Figure 1:
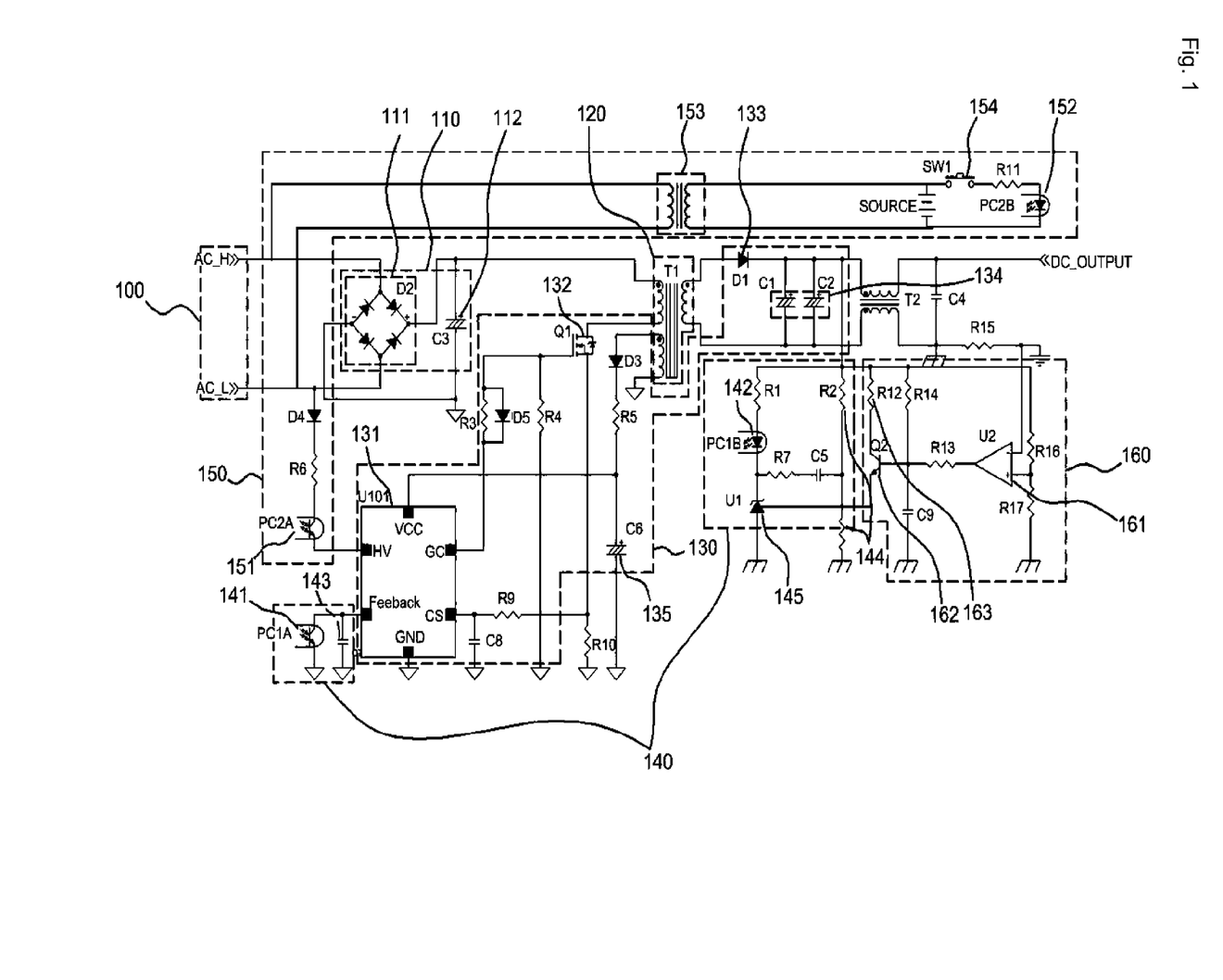
FIG. 1 is a circuit diagram showing a switching mode power supply including a first state transform unit and a second state transform unit in accordance with an embodiment of the present invention.

FIG. 1 is a circuit diagram showing a switching mode power supply including a first state transform unit and a second state transform unit in accordance with an embodiment of the present invention.

As shown in FIG. 1, the switching mode power supply in accordance with an embodiment of the present invention includes an alternating current (AC) power input unit 100, a rectifying unit 110, a main transformer 120, a pulse width modulation control unit 130, a feedback control unit 140, a first state transform unit 150, and a second state transform unit 160.

That is, compared with a switching mode power supply based on general technology, the switching mode power supply in accordance with an embodiment of the present invention basically includes the AC power input unit 100, the rectifying unit 110, the main transformer 120, the pulse width modulation control unit 130, and the feedback control unit 140, and further includes the first state transform unit 150 and the second state transform unit 160.

Generally, a direct current (DC) power supply device for transforming common AC power into direct current voltage is required to operate electric or electronic equipments. As the DC power supply device, switching mode power supply (SNIPS) is mainly used.

According to one embodiment of the present invention, as shown in FIG. 1, the rectifying unit 110 transforms AC power (AC_H, AC_L) input from outside into DC power. The AC power input in the rectifying unit 110 ranges 110 to 220V.

Also, the main transformer 120 transforms and outputs the DC power rectified in the rectifying unit 110. The pulse width modulation control unit 130 controls output voltage by applying a pulse signal to a primary winding of the main transformer 120. Since the DC power rectified in the rectifying unit 110 is high voltage, a device having a pressure-resistant characteristic to high voltage inside the pulse width modulation control unit 130 is required.

In addition, the feedback control unit 140 controls an output signal of the pulse width modulation control unit 130 by detecting output voltage of the main transformer 120.

Figure 2:
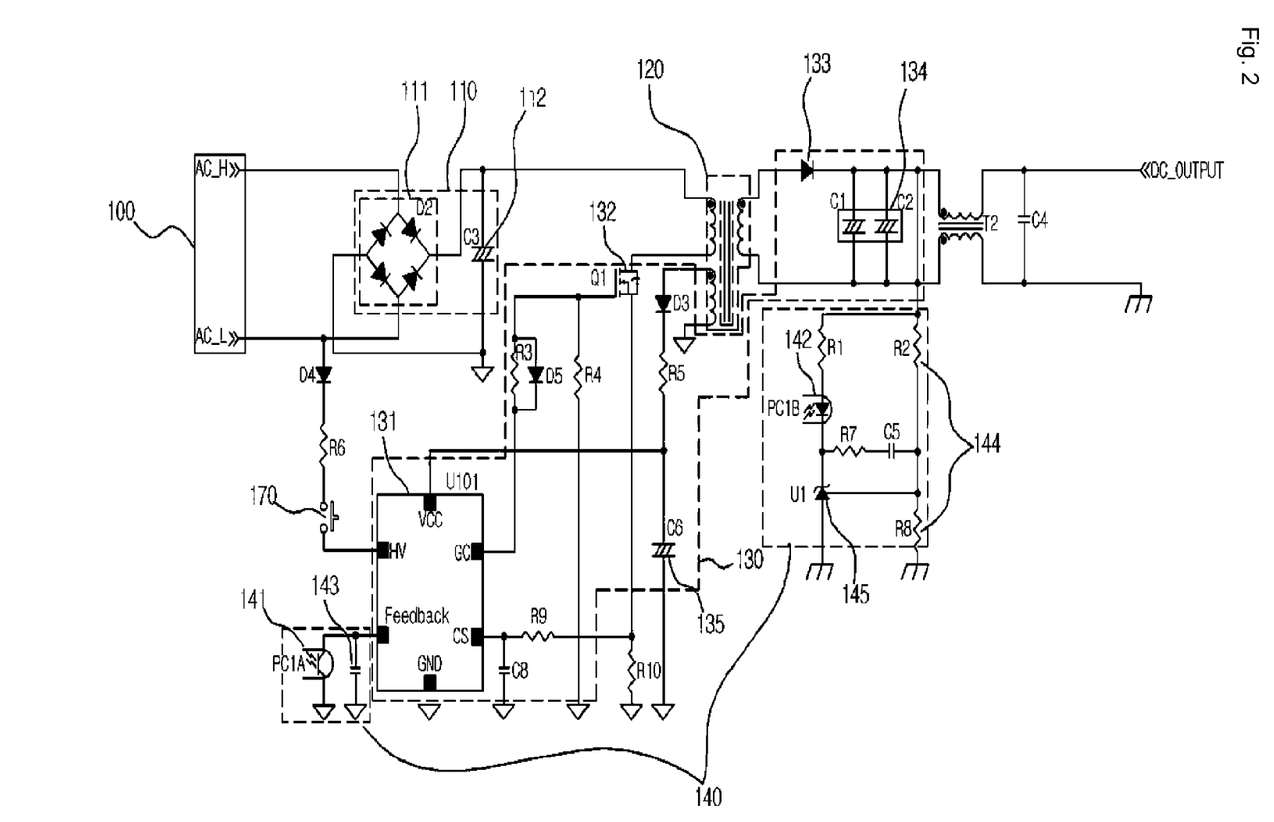
FIG. 2 is a circuit diagram showing the switching mode power supply including a first switching device in accordance with another embodiment of the present invention.

FIG. 2 is a circuit diagram showing the switching mode power supply including a first switching device in accordance with another embodiment of the present invention. As shown in FIG. 2, according to one embodiment of the present invention, the first switching device 170 having one end connected to the AC power input unit 100 and the other end connected to the pulse width modulation control unit 130 to perform switching of AC power supply to the pulse width modulation control unit 130 is included.

The other end of the first switching device 170 in accordance with an embodiment of the present invention is connected to a high voltage terminal (HV) of a pulse width modulation integrated circuit device 131 that performs diverse functions of the switching mode power supply.

Figure 3:
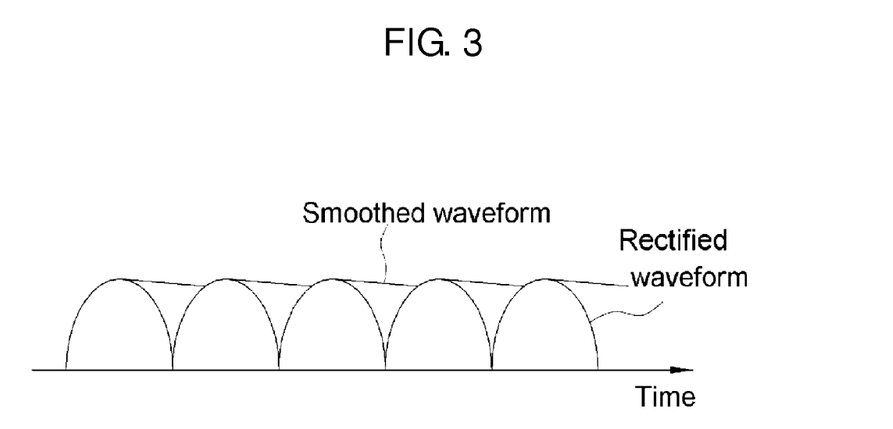
FIG. 3 is a diagram showing a waveform of voltage smoothed by a rectifying unit.

Referring to FIG. 1 again, the rectifying unit 110 in accordance with an embodiment of the present invention includes a bridge diode 111 and a smoothing capacitor 112. The bridge diode 111 rectifies AC power input from outside. The smoothing capacitor 112 transforms the AC power into DC power of the same waveform as shown in FIG. 3 to be applied to the primary winding of the main transformer 120. Also, the DC power rectified in the rectifying unit 110 is applied to the pulse width modulation control unit 130 that performs pulse width modulation (PWM) through a predetermined starting-resistor R6.

The pulse width modulation control unit 130 in accordance with an embodiment of the present invention receives starting-current from the rectifying unit 110, creates a pulse width modulation signal having a predetermined frequency and duty, and applies the pulse width modulation signal to a gate terminal of a main switching device 132 connected to the primary winding of the main transformer 120. The main switching device 132 for switching energy supply to a secondary winding of the main transformer 120 may be formed of a metal oxide semiconductor field effect transistor (MOS- FET). Although FIG. 1 shows the main switching device 132 as MOSFET, it is apparent that other switching devices may be used.

It is preferred that the main switching device 132 includes MOSFET for high voltage having a pressure-resistant characteristic to high voltage of higher than 650V. The main switching device 132 is used as a power switch.

As described above, the starting-current applied to the pulse width modulation control unit 130 from the smoothing capacitor 112 is controlled by the predetermined starting-resistor R6. The smoothing capacitor 112 performs filtering on the current pulse from the bridge diode 111 such that AC voltage can be substantially DC voltage.

Energy is supplied from the primary winding of the main transformer 120 to the secondary winding by switching of the main switching device 132 connected to the primary winding of the main transformer 120. The energy supplied to the secondary winding of the main transformer 120 is transformed into DC voltage based on primary and secondary winding ratios of the main transformer 120 through a predetermined diode 133 and an output capacitor 134 and is output to output voltage DC_OUTPUT.

The feedback control unit 140 in accordance with an embodiment of the present invention constantly maintains the output voltage by detecting the output voltage from the output capacitor 134 and controlling signal duty generated by the pulse width modulation control unit 130 according to the size of the output voltage.

The feedback control unit 140 in accordance with an embodiment of the present invention includes a first photo transistor 141, a first photo diode 142, and a first charging capacitor 143. The first photo transistor 141 forms a photo coupler with the first photo diode 142 and generates current of a predetermined size according to a current value flowing through the first photo diode 142.

In the first charging capacitor 143, charge quantity varies according to the current quantity flowing through the first photo transistor 141 to vary feedback voltage $V_{feedback}$. The feedback voltage $V_{feedback}$ is input to the pulse width modulation control unit 130.

The pulse width modulation control unit 130 in accordance with an embodiment of the present invention receives a detection voltage $V_{sense}$ detecting charge quantity flowing from a source to a drain of the main switching device 132. Also, the pulse width modulation control unit 130 receives charging voltage $V_{CC}$ of a predetermined second charging capacitor 135.

The pulse width modulation control unit 130 in accordance with an embodiment of the present invention controls a switching operation of the main switching device 132 by generating a proper switching control signal according to the feedback voltage $V_{feedback}$, the detection voltage $V_{sense}$, and the charging voltage $V_{CC}$.

That is, the pulse width modulation control unit 130 in accordance with an embodiment of the present invention controls switching of the main switching device 132 by outputting gate voltage to a gate terminal of the main switching device 132 to keep a normal operation mode or a waiting mode.

The secondary winding of the main transformer 120 in accordance with an embodiment of the present invention receives energy by switching of the main switching device 132 and generates current pulses. A predetermined diode D3 and the second charging capacitor 135 rectifies and smoothes the current pulses generated by the auxiliary winding of the main transformer 120 to supply the substantial DC voltage $V_{CC}$ to the pulse width modulation control unit 130. The secondary winding of the main transformer 120 is for an external electronic device and the auxiliary winding of the main transformer 120 is for the pulse width modulation control unit 130. The DC voltage $V_{CC}$ functions as a power supply for supplying regular voltage to the pulse width modulation integrated circuit device 131 in charge of diverse functions of the switching mode power supply.

The DC voltage that AC power (AC_H, AC_L) is full-wave rectified by the bridge diode 111 is supplied to the primary winding of the main transformer 120. The DC voltage applied to the primary winding of the main transformer 120 generates output voltage DC_OUTPUT to the secondary winding of the main transformer 120 at a regular duty cycle through switching of the main switching device 132. The duty cycle of the main switching device 132 is determined by a gate drive signal of the main switching device 132 output from the pulse width modulation control unit 130.

The output voltage generated in the secondary winding of the main transformer 120 has such a size that electronic devices adopting the switching mode power supply can perform the normal operation or waiting operation.

Meanwhile, the duty of the main switching device 132 should be properly controlled in order to maintain the regular output voltage generated in the secondary winding of the main transformer 120. Accordingly, the output voltage should be fed back. The fed back-output voltage is used to control the duty of the main switching device 132.

As shown in FIG. 1, according to the one embodiment of the present invention, the feedback control unit 140 includes first and second resistances 144 for distributing the output voltage generated in the secondary winding of the main transformer 120. Also, according to the one embodiment of the present invention, the feedback control unit 140 includes a variable regulator 145 for amplifying the voltage distributed by the first and second resistances 144 by a regular size. The voltage amplified by the variable regulator 145 is applied to the first photo diode 142.

Since the first photo diode 142 and the first photo transistor 141 form a photo coupler, current of a size corresponding to an input value of the first photo diode 142, i.e., an output value of the variable regulator 145, flows in the first photo transistor 141. The first charging capacitor 143 is charged by the current and the size of the feedback voltage $V_{feedback}$ is determined according to the charging quantity of the first charging capacitor 143.

The first state transform unit 150 in accordance with an embodiment of the present invention includes a second photo transistor 151 and a second photo diode 152. The second photo transistor 151 forms a photo coupler with the second photo diode 152. The second photo transistor 151 generates current of a predetermined size according to the value of the current flowing through the second photo diode 152.

According to one embodiment of the present invention, the second photo transistor 151 is included between the AC power input unit 100 and the pulse width modulation control unit 130 such that the AC power supplied to a high voltage terminal (HV) of the pulse width modulation integrated circuit device 131 varies according to the current value flowing through the second photo diode 152.

As shown in FIG. 1, the first state transform unit 150 in accordance with an embodiment of the present invention includes a transformer 153 and a second switching device 154. The transformer 153 is connected to the AC power input unit 100 to transform and output AC power. The second switching device 154 is connected to the secondary winding of the transformer 153 to switch energy supply from the primary winding of the transformer 153 to the secondary winding.

According to one embodiment of the present invention, one end of the second photo diode 152 is connected to a terminal of the second switching device 154 and the other end is connected to the secondary winding of the transformer 153. The second photo diode 152 receives energy supplied to the secondary winding of the transformer 153 by switching of the second switching device 154 to be turned on.

The second switching device 154 may be realized based on any one of methods using Radio Frequency Identification (RFID), a remote control, an adapter identification pin, or a touch switch.

For example, the switching mode power supply may be realized to include an RFID reader. The RFID reader oscillates radio wave having a predetermined frequency to the outside. When a device including the RFID tag enters within the region of the radio wave by being located close to the switching mode power supply, a predetermined magnetic field is generated by the radio wave in the RFID tag. Accordingly, data recorded in the RFID tag are transmitted to the RFID reader of the switching mode power supply along with the radio wave due to the magnetic field. In this case, the switching mode power supply drives the pulse width modulation integrated circuit device 131 by operating the second photo diode 152. The user may carry the device including the RFID tag.

Also, the electronic device adopting the switching mode power supply may include an identification pin on the switching mode power supply. When the switching mode power supply is connected to the electronic device, the electronic device recognizes insertion of the switching mode power supply through the identification pin. In this case, the switching mode power supply drives the pulse width modulation integrated circuit device 131 by operating the second photo diode 152.

In addition, a receiving unit for receiving a signal from a normal mobile transmitter of the user may be realized to be installed in the switching mode power supply. Otherwise, the switching mode power supply may be realized to share the receiving unit of the electronic device adopting the switching mode power supply. The switching mode power supply makes it possible to start the pulse width modulation integrated circuit device 131 by operating the second photo diode 152 based the signal that the receiving unit receives.

Also, the second switching device 154 may be realized as a touch switch. In this case, the switching mode power supply makes it possible to start the pulse width modulation integrated circuit device 131 by operating the second photo diode 152 based on a touch signal.

Figure 4:
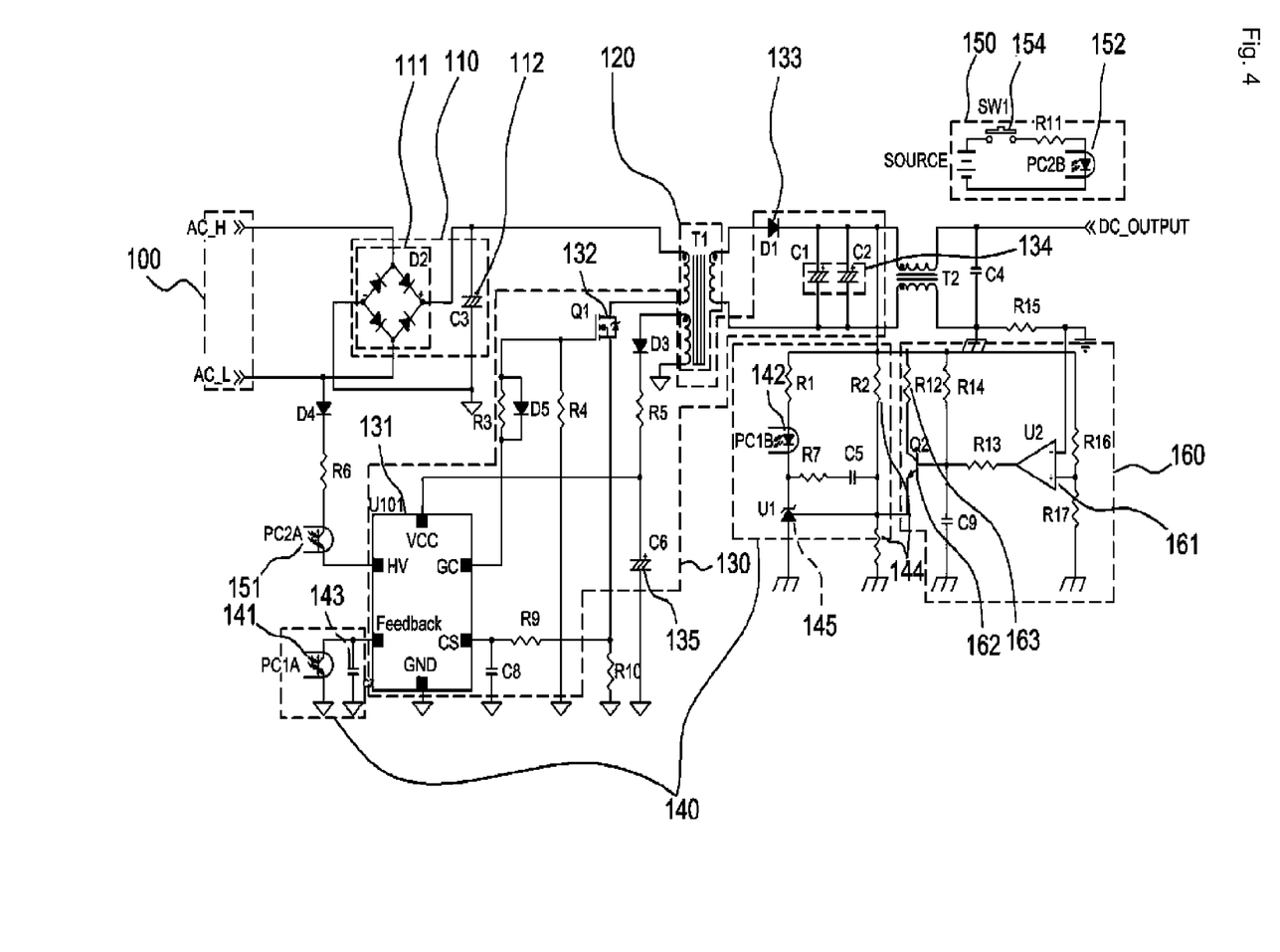
FIG. 4 is a circuit diagram showing the switching mode power supply including a battery or a large-capacity capacitor in accordance with still another embodiment of the present invention.

FIG. 4 is a circuit diagram showing the switching mode power supply including a battery or a large-capacity capacitor in accordance with an embodiment of the present invention. As shown in FIG. 4, the first state transform unit 150 may be realized to include any one of the battery and the large-capacity capacitor for supplying power to the second photo diode 152.

Referring to FIG. 1 again, the second state transform unit 160 in accordance with an embodiment of the present invention includes a comparator 161. The comparator 161 is connected to the secondary winding of the main transformer 120 and the output voltage and the reference voltage are applied to an inverting terminal and a noninverting terminal. The output voltage is compared with the reference voltage and is output through an output terminal.

The second state transform unit 160 further includes a transistor 162 and a third resistance 163.

The transistor 162 is connected to the first and second resistances 144 for distributing the output voltage in parallel and a base terminal is connected to an output terminal of the comparator 161.

In order to connect the third resistance 163 with the first and second resistances 144 for distributing the output voltage in parallel, one end of the third resistance 163 is connected with a collector terminal of the transistor 162 and the other end is connected with a node between the first and second resistances 144 for distributing the output voltage and the transistor 162.

According to one embodiment of the present invention, in the comparison result, when the output voltage is lower than the reference voltage, the first and second resistances 144 for distributing the output voltage are connected to the third resistance 163 in parallel by operating the transistor 162. Accordingly, the size of the input voltage supplied to the variable regulator 145 increases.

Figure 5:
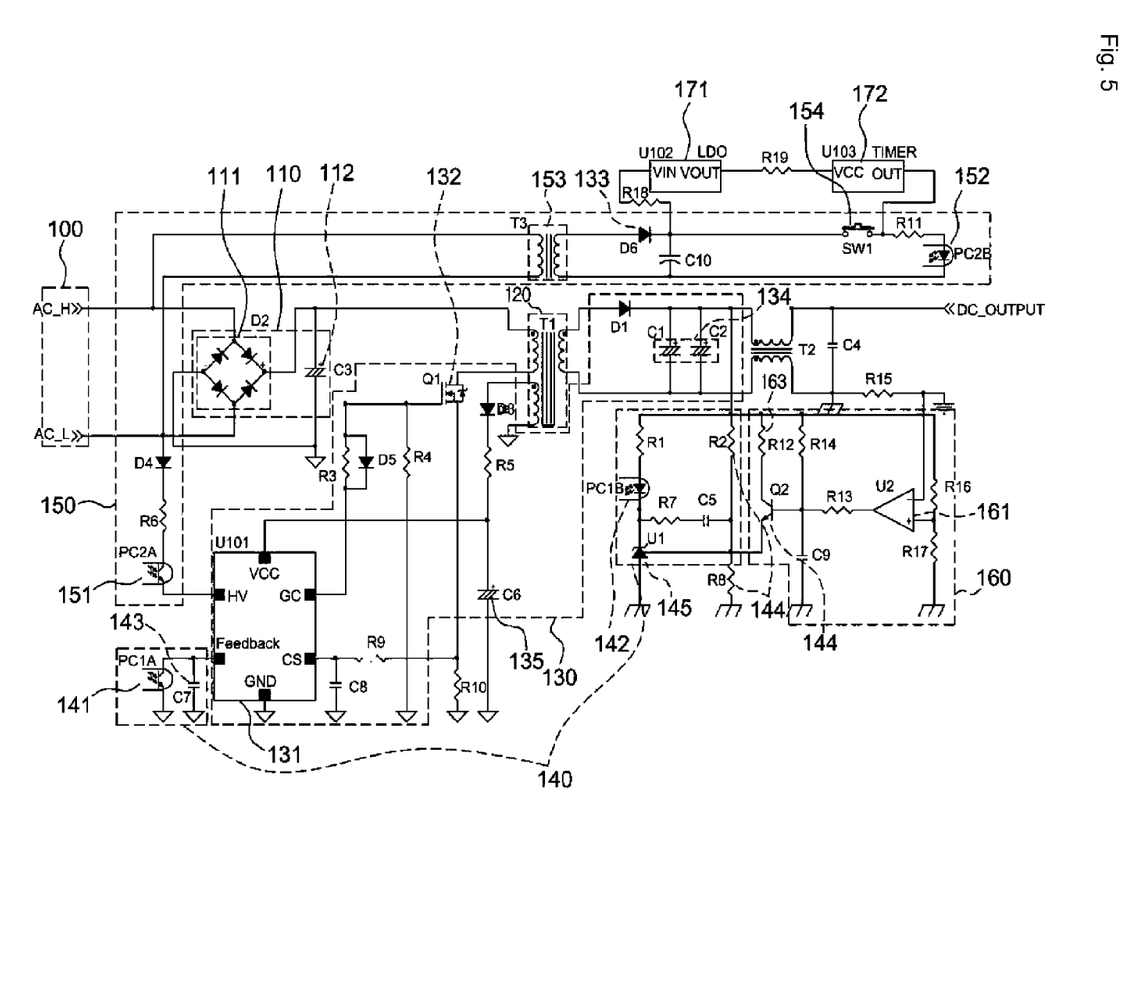
FIG. 5 is a diagram showing a first state transform unit.
Figure 6:
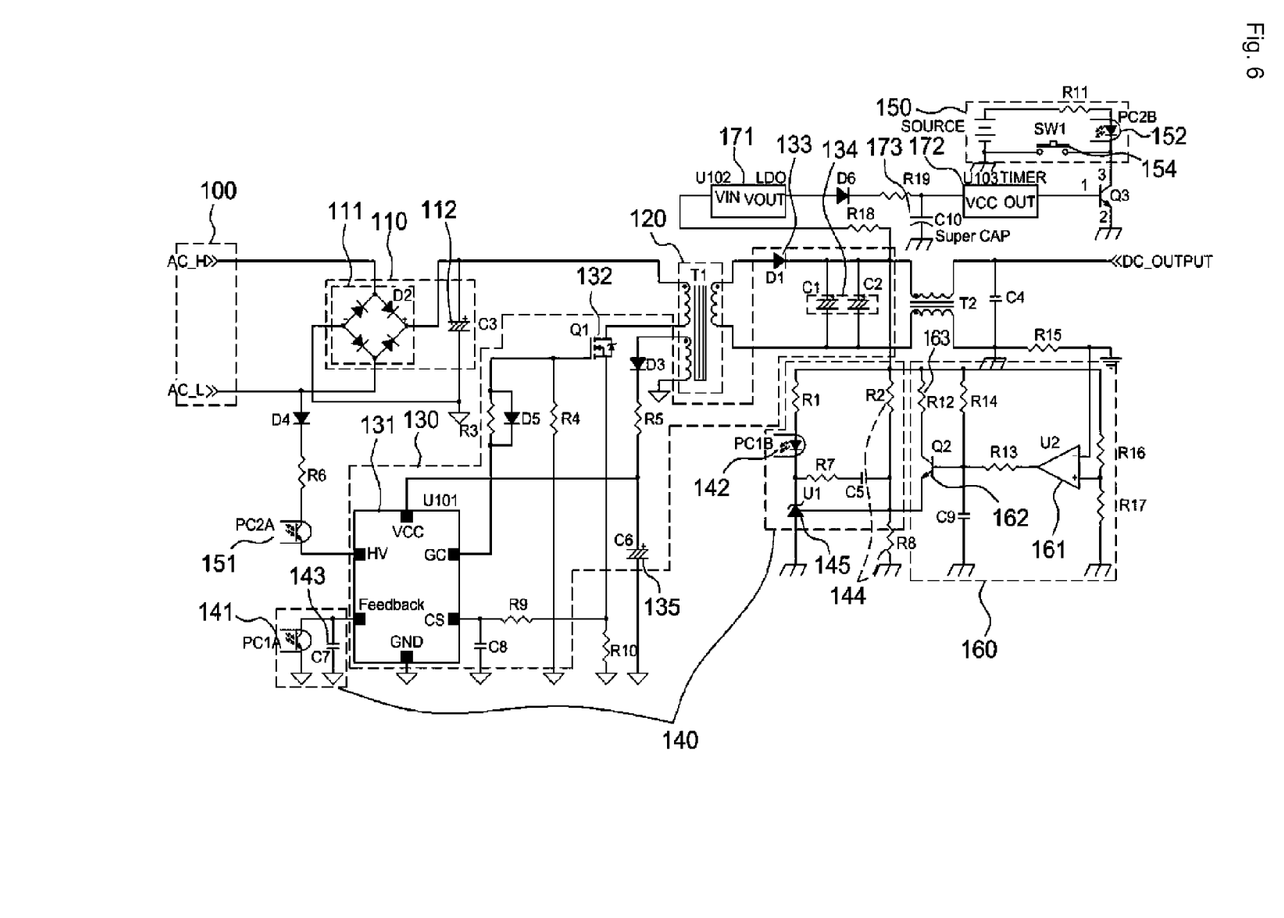
FIG. 6 is a diagram showing the first state transform unit in another embodiment.

FIG. 5 is a diagram showing a first state transform unit including a constant voltage transformer and a timer in accordance with an embodiment of the present invention. FIG. 6 is a diagram showing the first state transform unit including the constant voltage transformer and the timer in accordance with another embodiment of the present invention.

As shown in FIG. 5, the constant voltage transformer 171 and the timer 172 according to the embodiment of the present invention may be realized to be connected to the secondary winding of the transformer 153. As shown in FIG. 6, the constant voltage transformer 171 and the timer 172 may be realized to be included between the secondary winding of the main transformer 120 and the second switching device 154 of the first state transform unit 150.

The constant voltage transformer 171 and the timer 172 according to the embodiment of the present invention periodically operates the switching mode power supply by driving the pulse width modulation integrated circuit device 131 according to a selected period.

According to the embodiment of the present invention, output voltage of the transformer 153 is supplied to the constant voltage transformer 171 and the constant voltage transformer 171 receiving the output voltage transforms the output voltage of the transformer 153 into constant voltage and supplies the constant voltage to the timer 172.

The timer 172 according to the embodiment of the present invention performs a count operation by using the voltage supplied in the constant voltage transformer 171 and transmits a control signal. According to the embodiment of the present invention, the pulse width modulation integrated circuit device 131 may be driven by operating the second photo diode 152 by the control signal of the timer 172.

That is, when a device having a built-in auxiliary power such as a laptop computer is connected, it is for automatically operating the switching mode power supply such as an adaptor in a normal waiting state after a predetermined time although the user does not drive the first state transform unit 150.

Accordingly, when the device having the built-in auxiliary power such as the laptop computer completely consumes auxiliary power and cannot turn on power for itself, it drives the second photo diode 152 by operating the second switching device 152 of the first state transform unit 150 and the second photo diode 152 operates the switching mode power supply by operating the second photo transistor 151 and supplying DC power to the high voltage terminal of the pulse width modulation integrated circuit device 131.

The device receiving the power of the switching mode power supply according to the embodiment of the present invention may charge the auxiliary power. When the device receiving the power of the switching mode power supply is turned off and the quantity of the current decreases to the level that the current is not used, the switching mode power supply enters a low power mode. Subsequently, the constant voltage transformer 171 and the timer 172 operate to drive the switching mode power supply according to the set time period.

It is assumed that the device having the built-in auxiliary power such as the laptop computer is operated by auxiliary power. When switching mode power supply operates, consumption current is generated and the switching mode power supply maintains the operation until the quantity of the current decreases to the level that the device does not operate.

According to the embodiment of the present invention, when the switching mode power supply is operated by driving the second switching device 152 of the first state transform unit 150, output voltage is generated and the constant voltage transformer 171 transformed the output voltage into low voltage. The timer 172 drives the switching mode power supply according to a set time period by receiving the voltage, transmitting output once every set time, and supplying the DC power to the high voltage terminal of the pulse width modulation integrated circuit device 131.

According to the embodiment of the present invention, while the switching mode power supply is in operation, the voltage transformed into the low voltage in the constant voltage transformer 171 starts charging the device having the low charge capacity such as the large-capacity capacitor 173. Subsequently, when there is no device connected to the switching mode power supply or when the current of the level that the device does not operate is detected, the switching mode power supply stops operating and the timer 172 operates by using the device having the low charge capacity such as the large-capacity capacitor 173.

According to the embodiment of the present invention, when the timer 172 transmits output after a predetermined time by using the large-capacity capacitor 173, the switching mode power supply operates as described above and the output voltage is supplied to the constant voltage transformer 171 and the timer 172 to maintain the same operation.

Figure 7:
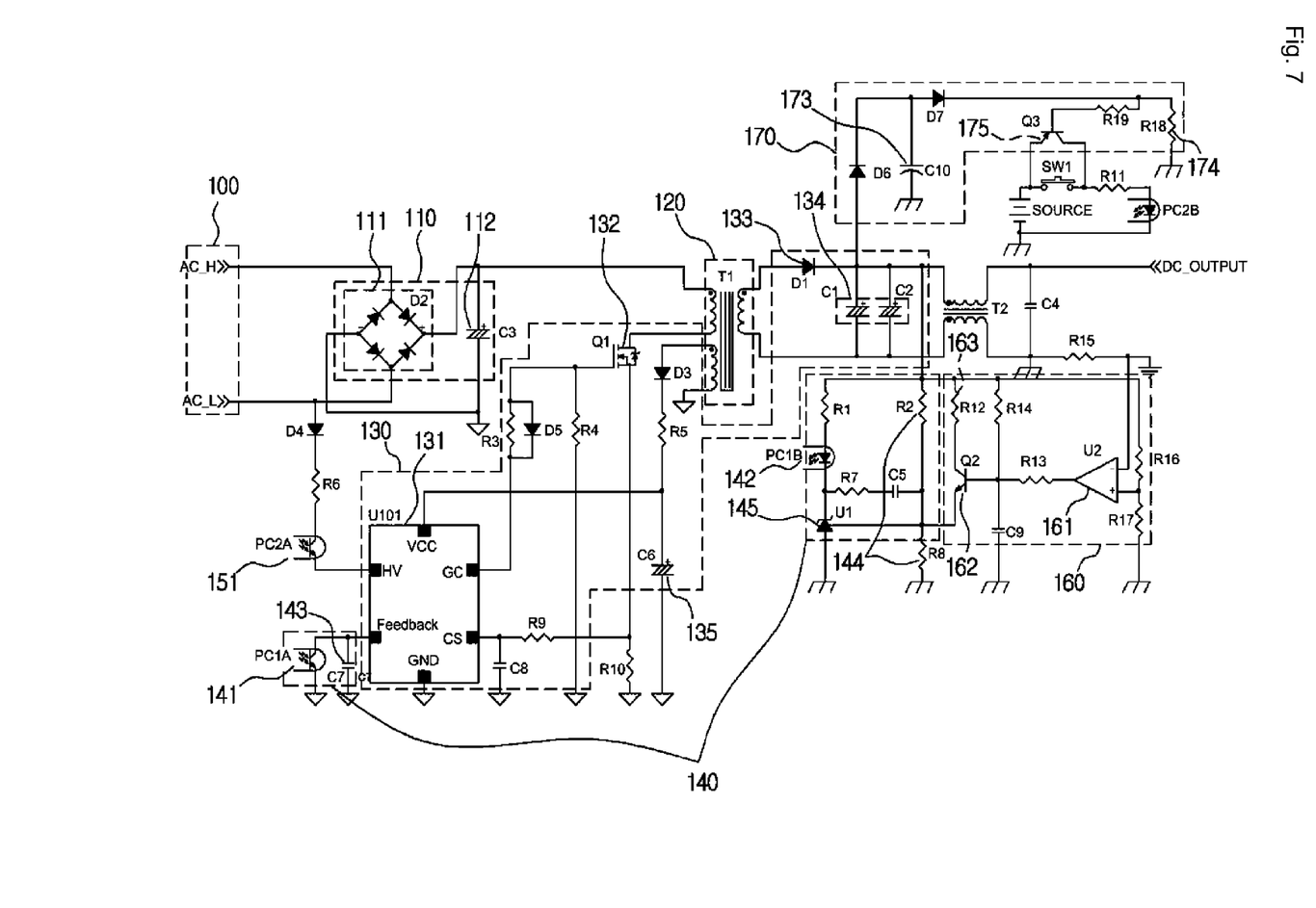
FIG. 7 is a circuit diagram showing the first state transform unit in still another embodiment.

FIG. 7 is a circuit diagram showing the first state transform unit including a timer circuit in accordance with an embodiment of the present invention.

As shown in FIG. 7, the timer circuit 170 according to the embodiment of the present invention includes a timer capacitor 173, a timer resistance 174, and a timer transistor 175. The timer circuit 170 according to the embodiment of the present invention drives by receiving the output voltage of the main transformer 120. That is, since the timer circuit 170 does not receive power by using the constant voltage transformer 171 but receives the output power of the switching mode power supply, the timer circuit 170 operates after the switching mode power supply enters a low power waiting mode.

According to the embodiment of the present invention, when the switching mode power supply is operated by operating the second switching device 154 of the first state transform unit 150, output voltage is generated and charges current to the timer capacitor 173 via a predetermined diode D6 of the timer circuit 170. When the device connected to the switching mode power supply detects current of a level that the device does not operate, the switching mode power supply enters a low power state. Subsequently, current is consumed in the timer resistance 174 and the voltage of the timer capacitor 173 gets lower. The lowered voltage operates the timer transistor 175 to operate the second photo diode 152.

The operated second photo diode 152 supplies DC power to the high voltage terminal of the pulse width modulation integrated circuit device 131 by operating the second photo transistor 151 and operates the switching mode power supply. When the switching mode power supply is connected to the DC power, such operation is repeated. When the device connected to the switching mode power supply is operated, the switching mode power supply supplies power to the device.

While the device connected to the switching mode power supply is in operation, the timer circuit 170 maintains a waiting state without operation. A maintenance time of the low power waiting mode in the switching mode power supply may be controlled by using the timer capacitor 173 and the timer resistance 174.

According to a control method of the switching mode power supply in accordance with an embodiment of the present invention, AC power is input.

According to the control method of the switching mode power supply in accordance with an embodiment of the present invention, the first state transform unit 150 is driven by receiving power from the transformer 153 or the battery and the large-capacity capacitor (SOURCE). That is, the first state transform unit 150 is a circuit for starting the pulse width modulation control unit 130.

According to the control method of the switching mode power supply in accordance with an embodiment of the present invention, when consumption current quantity of the electronic device using output voltage of the main transformer 120 for transforming and outputting the AC power is lower than a predetermined reference value, the second state transform unit 160 is driven.

The first state transform unit 150 controls supply of the AC power to the pulse width modulation control unit 130. The first state transform unit 150 receives input of the second switching device 154 to operate the second photo diode 152. The second photo diode 152 starts the pulse width modulation control unit 130 by supplying high voltage rectifying the AC power to the high voltage terminal (HV) of the pulse width modulation integrated circuit device 131 by operating the second photo transistor 151.

The second state transform unit 160 controls the size of the input voltage supplied to the feedback control unit 140 for controlling the output signal of the pulse width modulation control unit 130 based on the consumption charge quantity of the electronic device, i.e., the output current.

Also, the control method of the switching mode power supply in accordance with an embodiment of the present invention may be realized as a program command format to be operated through diverse computer means and be stored in a computer-readable recording media. The computer readable media may include a program command, a data file, a data structure, etc individually or in combination. The program command recorded in the media may be things that are specially designed or configured for the present invention or usable things that are known to those skilled in the art of computer software. Examples of the computer readable recording medium include magnetic media such as a hard disk, a floppy disk and a magnetic tape, optical media such as CD-ROM and DVD, a magneto-optical media such as a floptical disk, and hardware devices that are specially configured to store and perform the program command ROM, RAM, and a flash memory. The media may be transmitting media such as light or wire and a waveguide including a carrier wave for transmitting a signal designating a program command and a data structure. Examples of the program command include a high level language code that may be operated by a computer by using an interpreter as well as a machine code such as a code made by a compiler. The hardware device may be configured to be operated as more than one software module to perform the operation of the present invention and the reverse is also applied in the same manner.

While a number of exemplary embodiments have been described with respect to certain preferred embodiments and drawings, it will be apparent that the present invention is not limited to the above embodiments and various changes and modifications may be made from the description by those skilled in the art. Thus, the idea of the invention should be construed by the claims themselves described here-in-below and any equivalency or equivalent modifications of claims are intended to fall under the scope of the idea of the invention.

The invention claimed is:

1. A switching mode power supply (SMPS) comprising a rectifying unit transforming alternating current (AC) power input from outside into direct current (DC) power, a main transformer transforming and outputting the rectified DC power, a pulse width modulation control unit controlling output voltage by applying a pulse signal to a primary winding of the main transformer, and a feedback control unit controlling an output signal of the pulse width modulation control unit by detecting output voltage of the main transformer,
wherein the pulse width modulation control unit includes a pulse width modulation integrated circuit device including a high voltage terminal of 85 VAC to 600 VAC, the switching mode power supply further comprising: a first state transform unit, including: a second photo diode; and a second photo transistor that forms a photo coupler with the second photo diode and is included between the AC power input unit receiving the AC power and a high voltage terminal (HV) of the pulse width modulation integrated circuit device, wherein the first state transform unit further comprises any one of a battery and a large-capacity capacitor supplying power to the second photo diode,
wherein the first state transform unit, comprises: a timer circuit, comprises: a timer capacitor charging output voltage of the main transformer; a timer resistance consuming voltage charged by the timer capacitor when the switching mode power supply enter a low power state; and a timer transistor that is operated by the voltage consumed in the timer resistance.

2. A switching mode power supply (SMPS) comprising a rectifying unit transforming alternating current (AC) power input from outside into direct current (DC) power, a main transformer transforming and outputting the rectified DC power, a pulse width modulation control unit controlling output voltage by applying a pulse signal to a primary winding of the main transformer, and a feedback control unit controlling an output signal of the pulse width modulation control unit by detecting output voltage of the main transformer,
wherein the pulse width modulation control unit includes a pulse width modulation integrated circuit device including a high voltage terminal of 85 VAC to 600 VAC, the switching mode power supply further comprising: a first state transform unit, including: a second photo diode; and a second photo transistor that forms a photo coupler with the second photo diode and is included between the AC power input unit receiving the AC power and a high voltage terminal (HV) of the pulse width modulation integrated circuit device,
wherein the first state transform unit comprises: a constant voltage transformer for transforming a voltage level of the supplied voltage into constant voltage; and a timer performing a count operation by using voltage supplied in the constant voltage transformer and transmitting a control signal according to a selected period.

3. The switching mode power supply of claim 2, wherein the constant voltage transformer transforms the output voltage of the transformer or the output voltage of the main transformer into constant voltage.

4. The switching mode power supply of claim 2, wherein the first state transform unit, further comprises: a large-capacity capacitor included between the constant voltage transformer and the timer to charge voltage supplied in the constant voltage transformer and supply the charged voltage to the timer.

5. A switching mode power supply (SMPS) comprising a rectifying unit transforming alternating current (AC) power input from outside into direct current (DC) power, a main transformer transforming and outputting the rectified DC power, a pulse width modulation control unit controlling output voltage by applying a pulse signal to a primary winding of the main transformer, and a feedback control unit controlling an output signal of the pulse width modulation control unit by detecting output voltage of the main transformer,
wherein the pulse width modulation control unit includes a pulse width modulation integrated circuit device including a high voltage terminal of 85 VAC to 600 VAC, the switching mode power supply further comprising: a first state transform unit, including: a second photo diode; and a second photo transistor that forms a photo coupler with the second photo diode and is included between the AC power input unit receiving the AC power and a high voltage terminal (HV) of the pulse width modulation integrated circuit device,
wherein the first state transform unit further comprises: a transformer connected to the AC power input unit to transform and output the AC power; and a second switching device connected to the secondary winding of the transformer to perform switching of energy supply from the primary winding to a secondary winding of the transformer, wherein the second photo diode having one end connected to a terminal of the second switching device and the other end connected to the secondary winding of the transformer is turned on by receiving energy supplied to the secondary winding of the transformer by switching of the second switching device; and the second photo transistor is connected to the high voltage terminal of the pulse width modulation integrated circuit device.

6. A switching mode power supply (SMPS) comprising a rectifying unit transforming alternating current (AC) power input from outside into direct current (DC) power, a main transformer transforming and outputting the rectified DC power, a pulse width modulation control unit controlling output voltage by applying a pulse signal to a primary winding of the main transformer, and a feedback control unit controlling an output signal of the pulse width modulation control unit by detecting output voltage of the main transformer,
wherein the pulse width modulation control unit includes a pulse width modulation integrated circuit device including a high voltage terminal of 85 VAC to 600 VAC, the switching mode power supply further comprising: a first state transform unit, including: a second photo diode; and a second photo transistor that forms a photo coupler with the second photo diode and is included between the AC power input unit receiving the AC power and a high voltage terminal (HV) of the pulse width modulation integrated circuit device,
further comprising: a second state transform unit including a comparator connected to a secondary winding of the main transformer, to apply the output voltage and reference voltage to an inverting terminal and a noninverting terminal, and compare the output voltage with the reference voltage and output the voltage through an output terminal, wherein the second state transform unit further comprises: a transistor that is connected to first and second resistances distributing the output voltage in parallel and that has a base terminal connected to the output terminal of the comparator; and a third resistance having one end connected to a collector terminal of the transistor and the other end connected to a node between the first and second resistances distributing the output voltage and the transistor.

* * * * *